United States Patent

[11] 3,579,097

[72] Inventor Alfred J. Luden
  Osseo, Minn.
[21] Appl. No. 888,128
[22] Filed Dec. 30, 1969
[45] Patented May 18, 1971
[73] Assignee Bureau of Engraving, Inc.
  Minneapolis, Minn.
  Continuation of application Ser. No.
  664,808, Aug. 31, 1967, now abandoned.

[54] APPARATUS AND METHOD FOR MEASURING THE AMOUNT OF A SELECTED VAPOR IN AN ATMOSPHERE
5 Claims, 9 Drawing Figs.
[52] U.S. Cl. .................................................. 324/30R, 73/336.5
[51] Int. Cl. ................................................. G01n 27/42
[50] Field of Search ....................................... 324/30, 65; 23/230, 232, 253, 254; 204/1.1, 195; 73/336.5

[56] References Cited
UNITED STATES PATENTS

| | | | |
|---|---|---|---|
| 2,015,125 | 9/1935 | Polin | 324/65X |
| 2,278,248 | 3/1942 | Darrah | (324/30UX) |
| 2,962,897 | 12/1960 | Muller | 73/336.5 |
| 3,038,848 | 6/1962 | Brewer et al. | 204/195 |
| 3,296,098 | 1/1967 | Arthur | (204/1.1UX) |
| 3,354,057 | 11/1967 | Klingelhoefer | 23/230X |
| 2,015,125 | 9/1935 | Polin | 73/336.5 |
| 2,278,248 | 3/1942 | Darrah | 340/237 |
| 3,296,098 | 1/1967 | Arthur | 204/1 |
| 3,354,057 | 11/1967 | Klingelhoefer | 204/1 |

*Primary Examiner*—Edward E. Kubasiewicz
*Attorney*—Merchant and Gould

ABSTRACT: Apparatus and method for detecting and measuring the concentration of a particular gas in a gaseous mixture. A nonconductive, nonporous probe having a thin film of relatively nonconductive liquid thereon is placed in the gaseous mixture. The liquid film is capable of absorbing the particular gas to thereby change the electrical conductivity of the liquid film. The electrical conductivity of the film is measured to determine the concentration of the particular gas in the mixture. Preferably the probe is a generally U-shaped glass rod having a roughened exterior surface to aid in retaining the thin film of liquid thereon. The apparatus and process is especially effective to detect and measure the amount of ammonia vapor in the air, using distilled water to form the thin liquid film. As a result, ammonia in solution is readily measured by measuring the vapor in proximity to the solution.

Patented May 18, 1971 3,579,097
2 Sheets-Sheet 1
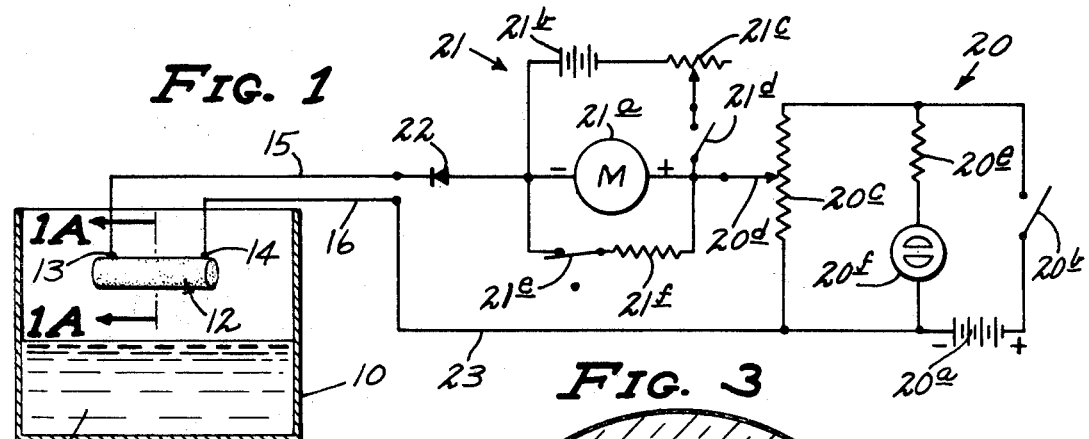
FIG. 1
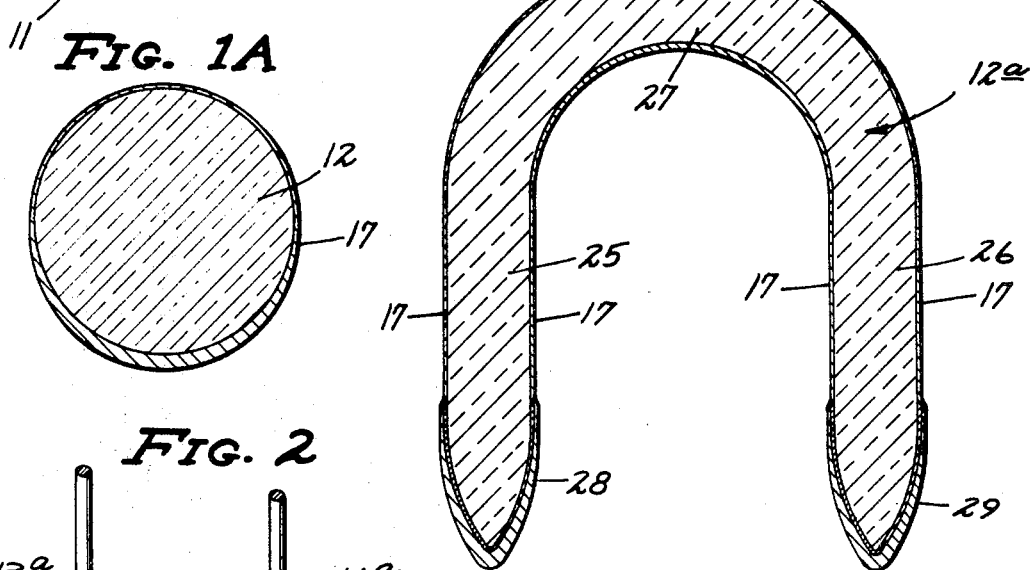
FIG. 1A
FIG. 3
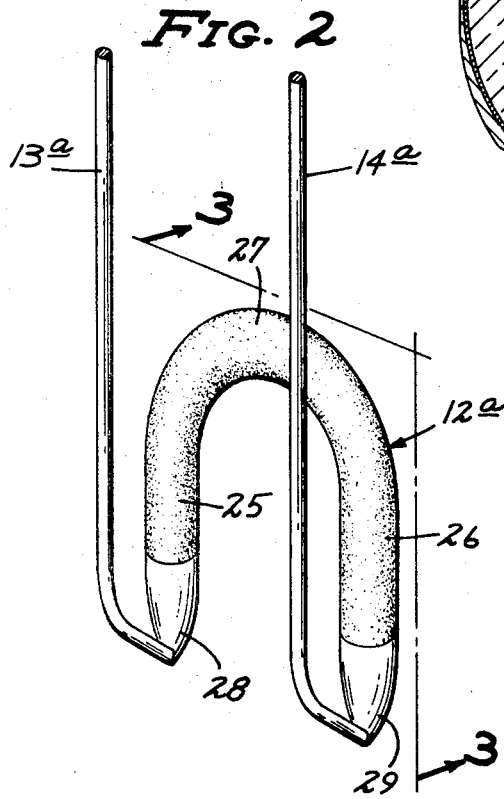
FIG. 2
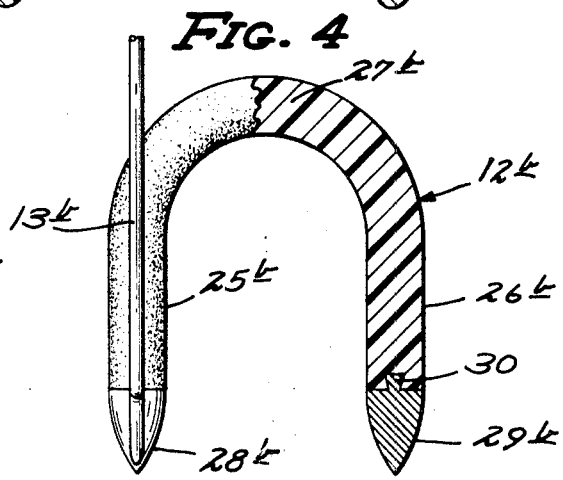
FIG. 4
INVENTOR.
ALFRED J. LUDEN
BY
Merchant & Gould
ATTORNEYS

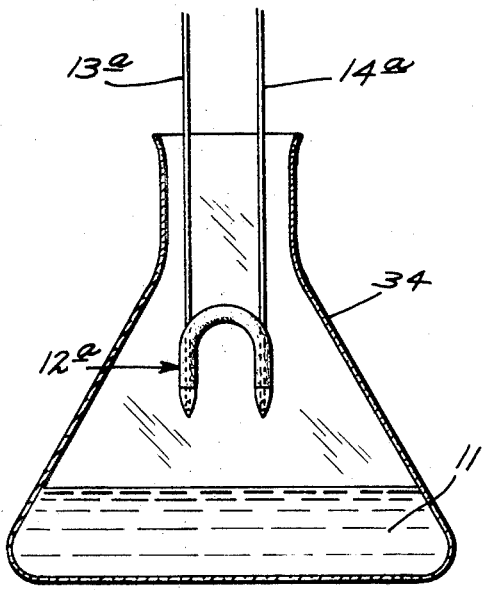
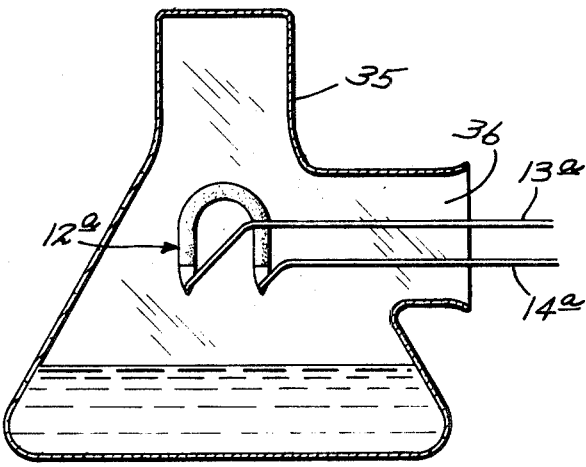
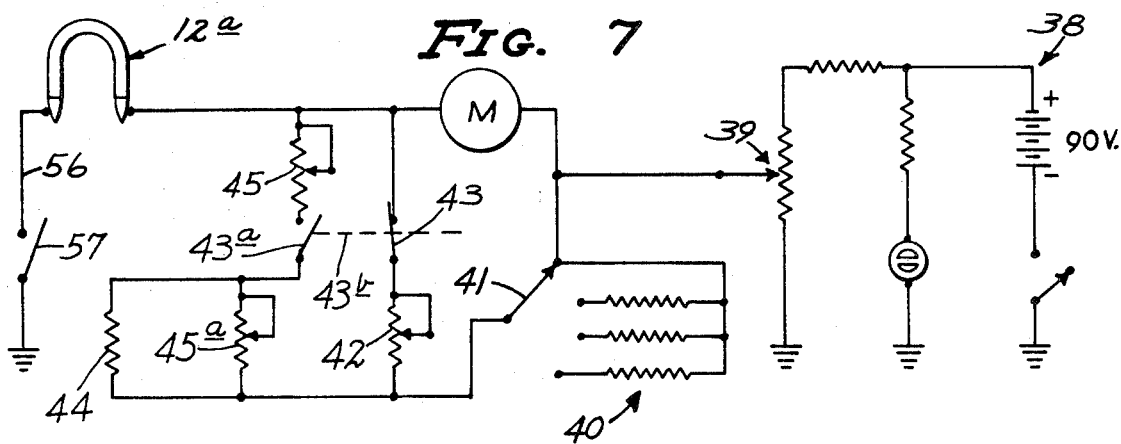
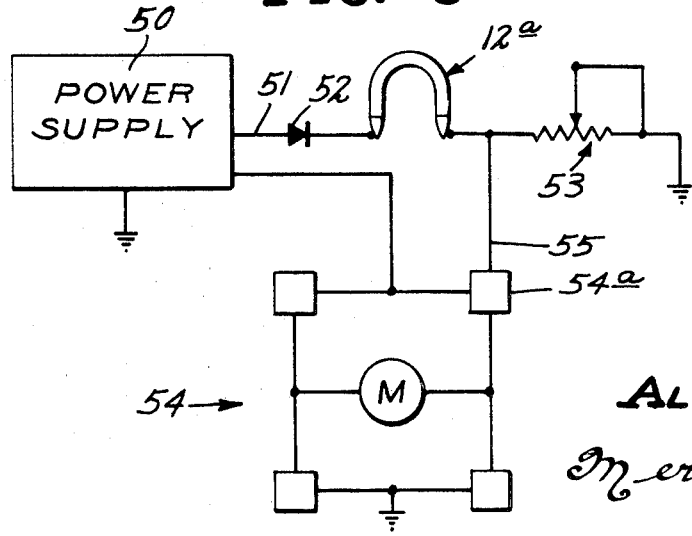

APPARATUS AND METHOD FOR MEASURING THE AMOUNT OF A SELECTED VAPOR IN AN ATMOSPHERE

This is a continuation of applicant's prior copending application Ser. No. 664,808, filed Aug. 31, 1967, now abandoned.

BACKGROUND OF THE INVENTION

1. Field of the Invention

This invention relates generally to gas testing devices and processes, and more particularly relates to means for detecting and measuring the concentration of a particular constituent gas in a mixture of other gases having no substantial effect on the measuring apparatus.

2. Description of the Prior Art

In the printed circuit industry, copper pyrophosphate electroplating baths are widely used to deposit copper on printed circuit boards. The object to be plated, the printed circuit board, is positioned in the bath and acts as a cathode. The anode is a copper bar. When a source of potential is applied across the anode and cathode, the copper bar is corroded and the resulting copper ions are transferred to the cathode where they are deposited as metallic copper.

If the plating is to proceed successfully, the copper from the bar must pass into solution at the same rate as it is being plated on the cathode. To prevent polarization and regulate the rate at which the copper bar is corroded, ammonium hydroxide ($NH_3OH$) is added to the bath. The concentration of ammonium ions in the bath must be maintained at the proper level if the plating is to proceed properly. Therefore, it is important that the ammonia content of the bath be known at all times. Since ammonia constantly being lost from the bath, some means of testing the ammonia content of the bath on a regular basis is required. In actual practice, it may be desirable to check the ammonia content every 4 hours of electroplating. In a large operation, where several electroplating baths are operating simultaneously, the tests must be capable of being performed rapidly and accurately. If too much time is required to conduct the test, the test results will be of little value because of changes in the ammonia content of the bath that occur during the testing interval.

Prior to the present development, no simple, quick and accurate method of determining the ammonia content of the baths was available. If accurate readings were desired, it was necessary to conduct cumbersome laboratory tests involving distillation of the bath liquid to obtain the ammonia. It was then necessary to back titrate the ammonia to determine concentration. This was not only time consuming, but also required the use of trained technical personnel to conduct the tests. As a practical matter, it was not feasible to utilize such testing methods in a commercial operation because of the time and expense involved.

Because of these difficulties, most commercial plating operations add ammonia to the bath on a purely empirical basis. The operator observes the plating results and if they do not appear satisfactory, more ammonia is added to the bath. The operator may also estimate the ammonia content of the bath from the smell of the ammonia vapors evolving from the bath. In either case, it is difficult to maintain the ammonia content of the bath at the proper level. The quality of the plating under such conditions is often poor.

SUMMARY OF THE INVENTION

The present invention provides means for rapidly and accurately determining the ammonia content of an electroplating bath by detecting and measuring the concentration of ammonia vapor emanating from the bath. The ammonia vapor concentration in the atmosphere above the bath will reach equilibrium with the bath concentration if the area above the bath is relatively free of air currents or other disturbing influences. Since the two concentrations are directly related, once equilibrium is reached, a measurement of the vapor is also a measurement of the bath.

To measure the ammonia vapor concentration, a nonconductive, nonporous probe, preferably a U-shaped glass probe, is placed in contact with the vapor that is in equilibrium with the bath liquid. A thin film of a relatively electrically nonconductive liquid, such as distilled water or alcohol, is placed on the probe as by dipping or spraying. The ammonia vapor in the atmosphere surrounding the probe is quickly absorbed by the liquid film and, within a short time, the concentration of ammonia in the liquid film reaches equilibrium with the concentration of ammonia vapor in the atmosphere. As the ammonia is absorbed by the liquid film, the film becomes increasingly conductive because of the free $NH_3$ ions in solution. At equilibrium, the electrical conductivity of the film is measured by electrical means as an accurate indication of the ammonia content of the bath.

A test of a single sample of bath liquid can be conducted in less than 2 minutes and the results are very accurate and repeatable. The test can be conducted by a relatively unskilled operator having a minimum of training. Consequently, it is now feasible to establish a continuous testing program under commercial operating conditions to monitor and regulate the ammonia content of the plating baths so as to achieve optimum plating results.

Although the present invention was developed in connection with the measurement of ammonia vapors evolving from plating baths, it should be understood that it has many other uses. Many other industrial and commercial situations call for the detection and measurement of vapors. The detection of toxic or otherwise dangerous vapors, the measurement of undesirable flue gases to decrease air pollution effects, and the detection of gases used to locate points of leakage in fluid flow systems are examples of other situations in which the present invention can be used.

Further details as to the construction, operation, and uses of the present invention will be apparent from the following full and complete description of the invention.

BRIEF DESCRIPTION OF THE DRAWINGS

FIG. 1 is a diagrammatic view of a gas detecting apparatus constructed according to my invention;

FIG. 1A is a transverse sectional view as seen from line 1A–1A of FIG. 1;

FIG. 2 is a view in perspective of a preferred form of probe as used in my gas detecting apparatus;

FIG. 3 is an enlarged sectional view as seen from line 3–3 of FIG. 2;

FIG. 4 is an elevational view of a modified probe structure, portions thereof being broken away and shown in section;

FIGS. 5 and 6 disclose two possible methods of mounting the probe to measure the concentration of a gas in a container;

FIG. 7 discloses a schematic view of an alternate electrical circuit used in my invention; and FIG. 8 is a schematic view of an alternate circuit, utilizing electronic components.

DESCRIPTION OF THE PREFERRED EMBODIMENTS

When referring to the drawings, like reference numerals will be used throughout the several views, whenever possible, to indicate like elements. In FIG. 1 there is disclosed a tank 10 partially filled with a liquid 11. As an example, the liquid 11 could be a solution of copper pyrophosphate used in the electrodeposition of copper. Mounted within container 10 above the surface of bath 11, is a nonconductive, nonporous probe 12, preferably constructed of glass, ceramic, or plastic. Attached at spaced apart points on probe 12 by metallizing or other equivalent means, are a pair of electrodes 13 and 14. Extending from electrodes 13 and 14 are a pair of conductors 15 and 16. Conductors 15 and 16 and electrodes 13 and 14 are sufficiently strong, and are attached to probe 12 such that they will support probe 12 in tank 10 as shown. No further means of supporting the probe itself is necessary.

FIG. 1A is a transverse section of probe 12 and shows that probe 12 is a solid glass rod. Also shown in FIG. 1A is a thin liquid film 17 carried on the surface of probe 12. Liquid film 17 is preferably a relatively nonconductive liquid such as distilled water, alcohol, or glycerine. Film 17 covers the entire surface of probe 12 between electrodes 13 and 14. As shown in FIG. 1A, the effects of gravity cause a thickening of film 17 on the lower surface of probe 12. An approach to eliminating or reducing this thickening of the film will be discussed in connection with other embodiments of my invention.

The circuit diagram shown in FIG. 1 includes a power supply generally designated 20 and a meter circuit generally designated 21. Power supply 20 includes a source $20a$ of DC potential connected in series with a switch $20b$ and the resistance element $20c$ of a potentiometer having a wiper arm $20d$. Connected in parallel with switch $20b$ and source $20a$ is a series circuit including a resistor $20e$ and a neon bulb $20f$.

Connected in series between wiper arm $20d$ and conductor 15 is a meter $21a$ and a diode 22. Connected in parallel with meter $21a$ is a series circuit including a battery $21b$, a potentiometer $21c$, and a switch $21d$. Also connected in parallel with meter $21a$ are a series connected switch $21e$ and a resistor $21f$. The negative side of source $20a$ is connected to conductor 16 by a conductor 23.

The system disclosed in FIG. 1 operates as follows. Assuming that bath 11 is an electroplating bath containing ammonium hydroxide, ammonia vapors will be evolving from the bath and will surround probe 12. Further assuming that the air is not turbulent within the upper portion of container 10, the concentration of ammonia vapor surrounding probe 12 will soon reach equilibrium with the concentration of ammonia in bath 11.

A thin film 17 of distilled water is placed on probe 12 either by dipping probe 12 in a container of such a liquid or by spraying the liquid on probe 12. Liquid film 17 will absorb the ammonia vapor from the surrounding atmosphere until the concentration of ammonium ions in film 17 reaches equilibrium with the vapor concentration. Usually only 1 or 2 minutes is required for the film 17 to reach the equilibrium concentration. Since ammonium ions are being absorbed by film 17, it becomes conductive and will carry a small current if a potential is applied across electrodes 13 and 14.

To measure the conductivity of film 17 on probe 12, power supply 20 is energized by closing switch $20b$. The voltage output of power supply 20 can be changed by moving wiper $20d$ on resistor $20c$. Meter $21a$ should of course be calibrated at zero with only pure, relatively nonconductive distilled water on probe 12. To zero the meter $21a$, a bucking voltage can be applied by closing switch $21d$ and adjusting potentiometer $21c$. The scale reading of the meter $21a$ can be changed by opening or closing switch $21e$.

As previously mentioned, a zero reading on the meter is obtained by energizing the circuit while probe 12 is covered with pure water or whatever other liquid is being used. Probe 12, covered with the nonconductive liquid film 17, is then inserted into tank 10 as shown in FIG. 1, where it comes in contact with the ammonia vapor. As the film 17 begins to absorb ammonium ions from the atmosphere, the conductivity of the film gradually increases until the equilibrium point is reached. As the conductivity increases, more current will flow between electrodes 13 and 14 and the meter will indicate this current flow. By testing various known solutions, the meter can be calibrated to read directly in terms corresponding to the ammonia concentration of the atmosphere surrounding probe 12 and of bath 11.

Although probe 12 can be constructed from a straight glass rod, as shown in FIG. 1, there are certain problems involved with this type of probe. As shown in FIG. 1A, the liquid film 17 on such a probe tends to be much thicker on the bottom surface of the probe because of the forces of gravity acting on the liquid film. In some cases, the buildup of film on the bottom surface can be heavy enough to break the film at the top or sides of the probe, thus breaking the circuit. The thicker film of liquid also requires a longer time to saturate and, if the same thickness of film is not achieved for each reading or test that is conducted, the accuracy of the test can be affected. A thicker film will carry more current than will a thin film, even if the ion concentration is at the same level. Therefore, it is desirable to shape the probe such that a thin, uniform film is formed each time a test is conducted.

To achieve these ends, I have designed a U-shaped probe $12a$ as shown in FIGS. 2 and 3. U-shaped probe $12a$ includes a pair of spaced arm portions 25 and 26 connected together at one end by a curved connecting portion 27. Arm portions 25 and 26 terminate at their other ends in a pair of spaced end portions 28 and 29.

Probe $12a$ is preferably constructed from a single piece of nonconductive, nonporous material, such as glass, so that its surface can be flushed completely clean after each test is completed. End portions 28 and 29 are metallized with an inert metal such as platinum or gold. The metal selected should not react with the vapor being measured. For example, if ammonia vapor is being measured, silver cannot be sued since it will react with the ammonia. Soldered or otherwise similarly connected to the metallized end portions 28 and 29 are a pair of electrodes $13a$ and $14a$ that are sufficiently strong to support probe $12a$. As shown in FIGS. 5 and 6, probe $12a$ is mounted in the gas to be tested with the two arm portions 15 and 26 generally vertically disposed and with connecting portion 27 positioned above end portions 28 and 29.

As best shown in FIG. 3, the U-shaped probe $12a$, when mounted in the position shown in FIGS. 5 and 6, is capable of carrying a very thin, uniform liquid film 17 over its entire surface between metallized end portions 28 and 29. Some buildup of film thickness does occur, caused by the effect of gravity on the film, at three different points. As shown in FIG. 3, a slight thickening of the film occurs on the bottom surface of the curved connecting portion 27. However, I have found that because of the smoothly curved surface and and round cross section, the buildup is quite small and is consistently of the same thickness from test to test.

A buildup of liquid also occurs on the two end portions 28 and 29, as shown in FIG. 3. The effects of this buildup are eliminated, however, by metallizing end portions 28 and 29 a sufficient distance from the tips of the end portions to short out the thicker film. The rather pointed tips of end portions 28 and 29 also help in more uniformly distributing the film over the end portions. In any event, end portions 28 and 29 can be metallized a sufficient distance to short out any buildup of film. Therefore, when the conductivity of probe $12a$ is measured, only that portion of film 17 carried by arm portions 25 and 26 and by connecting portion 27 is included in the circuit. It should also be noted that after electrodes $13a$ and $14a$ are soldered on the metallized tips, the solder is overplated with an inert material to prevent the solder from contaminating the film on the probe. Thus, the solder can be overplated with a material such as gold having a nickel base. It is important to insure that none of the metal attached to the probe reacts with the vapor being tested since this would cause erroneous readings to occur.

I have also found that a more uniform, continuous film can be formed on the probe by roughening the outside surface of the probe. The surface of probe $12a$ can be roughened by subjecting it to a sand blasting operation or by etching it with chemicals. The surface should be made sufficiently rough to wet well so that the liquid film will completely cover the probe surface without dewetting (breaking the film). However, the film should not be so rough that the film becomes too thick or so that roughened portions of the surface protrude through the film. The optimum roughness of the surface will depend to some extent upon the liquid being used to form the film. For example, if alcohol is used, the roughening must be very slight since alcohol naturally tends to form a very thin film. If glycerine is used, however, the surface can be made much rougher because the glycerine is so much more viscous. I have successfully utilized aluminum oxide to sandblast the surface of these probes to achieve the proper roughness. The roughness can be controlled by varying the pressure of the sand blasting operation and by varying the grit size.

FIG. 4 discloses another alternate embodiment of the probe, designated 12b. Probe 12b has the same preferred configuration as probe 12a, but it is constructed in a different manner. The arm portions 25b and 26b and the curved connecting portion 27b of this probe are molded from a plastic material. Again, probe 12b is nonconductive so that it will have no effect on the conductivity readings. Further, probe 12b is nonporous so that it can be quickly and completely cleaned after each test is completed. End portions 28b and 29b are constructed from a suitable inert material. Preferably, end portions 28b and 29b each have a pin 30 extending axially outwardly from their flat ends. End portions 28b and 29b are positioned during the molding process such that pins 30 are molded directly into the flat ends of arm portions 25b and 26b. Pins 30 therefore rigidly secure the end portions to the arm portions of probe 12b. The electrodes are then soldered or otherwise attached to the end portions of probe 12b as previously described.

In testing the vapors arising from a bath, the preferred approach is to take a representative sample of the bath and place it in a small beaker or other container so that the area above the bath surface is protected from air currents and other disruptive influences. FIG. 5 discloses the use of a standard Erlenmeyer flask 34 to test a representative sample of bath liquid 11. Only a small amount of bath liquid 11 is placed in flask 34 so that there is sufficient room above the surface of the liquid to mount probe 12a. Probe 12a is inserted downwardly through the open neck of flask 34 by means of electrodes 13a and 14a, which in turn are mounted on a suitable insulator (not shown). Probe 12a is inserted downwardly into the main body portion of flask 34 so that it is completely surrounded by the vapors emanating from bath liquid 11.

FIG. 6 discloses a modified flask 35 having a side opening 36 into which probe 12a is inserted. Flask 35 has the general shape of a standard Erlenmeyer flask except that a side opening 36 is provided instead of the usual upper opening. Flask 35 is especially adapted for use with an instrument having probe 12a extending laterally from the side thereof. With the probe mounted as shown in FIG. 6, it need not be moved as successive tests are conducted. Only flask 35 is moved after each test is completed. The configuration of flask 35 is also helpful in avoiding certain condensation problems that can arise if a standard Erlenmeyer flask 34 is used. If a cover or cork is used on flask 34 to completely seal the interior, condensation will sometimes form on the under surface of the cover. In some cases, this condensation can short out the electrodes 13a and 14a to cause erroneous readings. This type of problem is minimized by using the configuration of flask 35.

A typical test to determine the ammonia content of an electroplating bath would be conducted as follows. Assuming that the circuit of FIG. 1 is to be used with a U-shaped probe, the first step is to calibrate the meter. This calibration is achieved by conducting tests of several known samples. For example, four or five bath samples are prepared having a known ammonia content. The individual known samples are placed in separate flasks such as flask 34 and are maintained at a known temperature such as room temperature or some higher desired temperature such as 110° F. Using the circuit of FIG. 1, it is necessary to maintain the samples at known temperature since the amount of ammonia being evolved from the bath varies with changes in temperature. The flasks containing the known solutions can be maintained at a desired temperature with a laboratory water bath or other similar means. The flasks containing the known samples should of course be covered to prevent the loss of ammonia vapor.

Each of the known samples is tested as follows. The probe is prepared for use by flushing it with the liquid material chosen for the given application. If distilled water is to be used, the probe is thoroughly flushed with distilled water to remove all traces of contamination. Before the probe is placed in the flask, the circuit is adjusted to obtain a zero reading on the meter. The cover of the flask is then removed and the probe inserted to a position just above the solution level. The thin film of water on the probe immediately beings absorbing the ammonia vapor in the flask, thus rendering the film conductive. Within less than two minutes, in the case of distilled water, a maximum reading on the meter is achieved indicating that the concentration of ammonia in the thin film on the probe is in equilibrium with the vapor concentration in the beaker. The reading on the meter is then a calibration point for the particular known concentration of solution being tested. The probe is then removed from the beaker and flushed thoroughly. The above steps are then repeated for the other known solutions. By testing a number of known solutions, a graph can be prepared establishing a curve for the particular range of concentrations being tested.

After the calibration testing has been completed, a similar sample of unknown solution is placed in a similar flask and is immediately covered to prevent the loss of ammonia vapor. The temperature of the unknown sample is stabilized at the desired level before the test is conducted. The probe is then thoroughly flushed with the same liquid, distilled water, used in testing the known samples and then the steps outlined above for the known samples are repeated for the unknown sample or samples. The meter reading for each unknown sample can then be compared with the curve established from the known samples to give a direct measurement of the free ammonium hydroxide present in solution.

The graph that is prepared from the testing of the known solutions is valid as long as the same conditions are present. If the temperature of the bath solution is changed, or if a different material is used to form the liquid film on the probe, a new graph must be prepared. Further, if there is a radical change in the concentration of ammonia in the bath liquid, it may be necessary to use a different scale on the meter and prepare a corresponding graph.

In order to show the accuracy and repeatability of the present invention, the following tests were conducted. Five different samples of solution in the medium range of concentration were prepared to obtain data on operation. Five different concentrations, 0.2, 0.4, 0.6, 0.8, and 1.0 oz. per gal. were used. Each of these five known samples were then split into two 50 ml. samples so that one portion could be used to establish a set point and the other used as an unknown. All of the solutions were copper pyrophosphate solutions containing $NH_3$ and all tests were conducted at a temperature of 114° F. The following chart shows the results of testing these samples.

|  | Ammonia concentration | Meter reading |
| --- | --- | --- |
| Set sample | .2 oz./gallon | .20 |
| Test sample | .2 oz./gallon | .20 |
| Set sample | .4 oz./gallon | .33 |
| Test sample | .4 oz./gallon | .33 |
| Set Sample | .6 oz./gallon | .42 |
| Test sample | .6 oz./gallon | .41 |
| Set sample | .8 oz./gallon | .51 |
| Test sample | .8 oz./gallon | .51 |
| Set sample | 1.0 oz./gallon | .54 |
| Test sample | 1.0 oz./gallon | .55 |

In three out of the five tests, the meter readings for the set sample and the test sample were exactly the same. In the other two tests, a 0.01 difference in the reading between the set sample and the test sample resulted. This is an insignificant difference.

The size of the sample is not critical to the performance of this system. It is only necessary that the sample be representative of the larger bath solution being tested and that the area above the sample be protected so that the concentration of the vapor being evolved from the sample will reach equilibrium with the material in solution. I have found that it is easiest to work with a 50 ml. sample in a 250 ml. Erlenmeyer flask. It is noted at this point that in some copper pyrophosphate baths, some of the ammonium hydroxide in solution is complexed. If this is the case, it can be freed by the addition of sodium hydroxide to the solution before the test is conducted.

FIG. 7 discloses a modified circuit having means for simplifying the testing procedure. A power supply 38 is provided having a potentiometer 39 for adjusting the output thereof. In order that a wide range of concentrations can be tested, a plurality of scale change resistors 40 are provided together with a switch 41 to connect the desired resistor in parallel with the meter.

Connected in series with switch 41 is a potentiometer 42 and a switch 43. This series circuit is connected in parallel with the meter. Connected in parallel with this series circuit is another series circuit including a temperature compensation thermistor 44, a switch 43a, and a potentiometer 45. Another potentiometer 45a is connected in parallel with temperature compensation thermistor 44. Switches 43 and 43a are connected by an operating member 43b so that the two switches operate simultaneously. When one of the switches is open, the other is closed.

The circuit of FIG. 7 operates as follows. The proper scale range setting is selected by adjusting switch 41, and the meter is calibrated to a zero position by adjusting potentiometer 39. If temperature compensation is desired, switch 43a is closed and switch 43 is opened. The circuit containing thermistor 44 and the two potentiometers 45 and 45a is then connected in parallel with the meter. Potentiometer 45 acts as a coarse adjustment for the amount of current bypassing the meter, while potentiometer 45a acts as a fine adjustment. By adjusting potentiometers 45 and 45a, the effectiveness of influence of thermistor 44 on the circuit can be changed.

Thermistor 44 has a negative temperature coefficient so that as the temperature rises, the resistance falls. It is known that when the temperature of the solution being tested rises, the amount of vapor being evolved will increase at a known rate. The conductivity of the thin film on probe 12a will increase because of the higher concentration of vapor in the atmosphere at the higher temperature and because of the higher ionic activity in the film. In the previously described circuit of FIG. 1, this problem was overcome by testing at a known temperature. To eliminate the need for maintaining the sample at a constant temperature, thermistor 44 is connected in parallel with the meter and is designed to change its resistance with temperature so that changes in conductivity caused by temperature are compensated for. Thus, as the temperature rises, more current will flow through the thin film on probe 12a. Because of the reduced resistance of thermistor 44, however, much of this current will bypass the meter through thermistor 44 to cancel out the effect of the temperature change. Thermistor 44 is selected so that its resistance drops at the same rate as the conductivity of probe 12a rises with an increase in temperature.

Thermistor 44 is normally designed to be inserted directly into the liquid sample being tested. If there is a large difference in temperature between the sample and the area surrounding probe 12a, it might be necessary to mount an additional thermistor adjacent the probe to measure the temperature at the interface of the film on the probe and the vapor. In that case, the two thermistors would be mounted in parallel to give an average reading. If desired, the temperature compensation feature can be eliminated by closing switch 43 and opening switch 43a. In that case, potentiometer 42, being adjusted to have the same basic resistance as the circuit including thermistor 44, replaces the thermistor circuit.

Connected in series with a conductor 56 between probe 12a and ground is a manually operated switch 57. Switch 57 provides a means of energizing and deenergizing the circuit from a point adjacent probe 12a. Also, switch 57 can be used to calibrate the system in a manner not heretofore described. Normally, probe 12a is exposed to a series of known solutions to provide a series of readings on the meter that will correspond to the known concentrations. At each of these levels, probe 12a will have a measurable resistance. Therefore, once a solution has been tested so that a known concentration corresponds to a known resistance of probe 12a, which in turn corresponds to a known meter reading, future calibration can be done by simply removing probe 12a from the circuit and substituting in its place a fixed resistor equivalent to the resistance of probe 12a at the desired level of concentration. A number of such resistors can be made available for each scale range so that the meter can be quickly calibrated without resorting to standard solutions. Switch 57, which is mounted closely adjacent probe 12a, can be utilized by an operator to deenergize the circuit during the time that probe 12a and the fixed resistor are not connected in the circuit.

FIG. 8 discloses another circuit, employing electronic components, that can be used to measure the conductivity of the probe. A power supply 50 is provided having a known B+ output voltage at a conductor 51. Connected in series between conductor 51 and ground are a diode 52, the probe 12a, and a potentiometer 53. The output voltage from power supply 50 is thus divided between probe 12a and potentiometer 53 as determined by the setting of the wiper on potentiometer 53. Preferably, potentiometer 53 has a very high resistance on the order of one megohm. Therefore, only a very small current will flow through the film on probe 12a, but even a slight change in conductivity of the thin film will result in a very large voltage drop across probe 12a.

To measure this shift in voltage drop as the conductivity of probe 12a changes, a bridge circuit 54, employing electronic components, is provided. Power supply 50 is connected across one pair of legs of bridge 54 and a meter is connected across the other pair of legs. A variable component 54a (electron tube or transistor) of bridge 54 is connected by a conductor 55 to a point between probe 12a and potentiometer 53. To operate this system, the power supply 50 is energized, probe 12a is flushed and left with a thin film of liquid, and the wiper on potentiometer 53 is adjusted to give a zero reading on the meter. When probe 12a is inserted into the vapor to be measured, it becomes more conductive and takes less of a voltage drop. This shift in the voltage drop between probe 12a and potentiometer 53 is detected by variable component 54a through conductor 55, upsetting the balance of the bridge. This unbalance is reflected in the meter reading. This electronic system is very sensitive to even extremely small concentrations of vapor. In actual tests, it has responded to 70 parts per million of ammonia in water, giving a midscale reading. Further, the scale readings have been repetitive to within two percent between samples of the same solution. The system responds equally well to very high concentrations of ammonia.

The electronic system will also minimize the effects of polarization of the probe. In this type of system, polarization can appear as a reverse potential that causes error in the meter reading. This polarization results from a potential being impressed on the probe in a single direction for a long period of time. Because of the extremely small current flow through the film on the probe in the electronic version, the effects of polarization are practically eliminated. If the other versions of the circuit are used, the effects of polarization can be minimized by using a pulsed DC signal rather than a continuous signal or by periodically reversing the direction of current flow through the probe film.

Although the preferred embodiment of my invention has been discussed in connection with the measurement of the ammonia content of an electroplating bath, I do not wish to be limited to such a specific end use. In addition to its use as a device for measuring the concentration of vapors in a given area, it can be used as a simple detection device to detect the presence of certain vapors. Therefore, it can be used in industrial plants as a safety device to detect the presence of excess amounts of ammonia or sulfur dioxide in the atmosphere. It can be used as a pollution control device by detecting the presence of undesirable flue gases. It can be used to detect leakage in piping systems by introducing ammonia into the system and then detecting the point of leakage.

The present invention is a great improvement over the prior art devices because individual tests can be performed very rapidly by even relatively inexperienced personnel, and the test results will be accurate and repeatable. The thin film on the probe saturates very rapidly to give quick response and, because it is so thin, it will measure very low concentrations of vapor with great accuracy. The use of a nonporous type probe allows the probe to be immediately and completely cleaned and recoated with fresh liquid after each test. The probe can be coated by dipping or by spraying so that no complicated supplementary equipment is required. The device is also portable and does not require a large supply of liquid.

One of the most important features of the present invention is that it senses the concentration of vapor directly by reaching a stable equilibrium point. Consequently, as opposed to many prior art gas testing devices, it is not necessary to know the volume of gas involved.

The particular sensing liquid that is used on the probe is not critical to my invention. I have previously mentioned the use of distilled water, alcohol and glycerine. In addition, other liquids or combinations of liquids with dissolved chemicals in solution can be used. It is only necessary that the liquid be capable of absorbing the vapor being detected and measured, to change the electrical conductivity of the film on the probe.

Although the electrical conductivity of the film will rise when vapors such as ammonia or sulfur dioxide are absorbed, some vapors will actually cause the electrical conductivity of the film to decrease when they are absorbed. For example, I have detected and measured formaldehyde vapor utilizing an alcohol film on the probe. The absorption of the formaldehyde vapors by the alcohol film actually causes the electrical conductivity to decrease a measurable amount. In the case where such vapors are to be detected or measured, it may be desirable to use a more conductive film initially so that the decrease in conductivity can be more accurately measured.

The present invention will give an accurate reading quickly because the thin film saturates quickly, homogeneously and completely. The reading obtained is independent of time once the film is saturated. Therefore, it is not necessary to measure either the volume of the gas or the time that the probe is exposed to the gas. Readings can be obtained in less than 1 minute if alcohol is used, and from one to two minutes with water. The time it takes to saturate the film varies with the probe design, the thickness of the film, the type of film, the concentration of the vapor, the temperature of the vapor and the applied potential. A somewhat quicker reading can be obtained with the low current, electronic version.

Many variations on the present invention may occur to those skilled in the art. For example, the probe could consist of a glass tube having the electrodes metallized on the inner surface. The inner surface of the tube would then be wet with the selected liquid and the unknown gas would be passed through the tube. Such a device could be used to measure the concentration of a vapor flow.

In another variation, the sensor could be placed in a container such as a bell jar. The container would be evacuated and purged with an inert gas, the probe or sensor would be wet and then the gas to be measured would be introduced.

It is possible that in some situations, there may be more than one gas in the atmosphere that will be absorbed by the thin film to render the film conductive. If it were desired to measure only one of the gases, the other gas could be removed by filtering the atmosphere to either initially select the desired gas for measurement or eliminate the unwanted gas or gases. For example, the mixture of gases could be bubbled through a solution or passed through a gas absorbing cartridge that would absorb only the unwanted gas.

Again using ammonia as an example, it should be clearly understood that once the ammonia concentration of the film on the probe reaches equilibrium with the ammonia vapor concentration of the surrounding atmosphere, the film concentration will remain in equilibrium with the surrounding atmosphere whether the vapor concentration in the atmosphere rises or falls. If the ammonia vapor concentration of the surrounding atmosphere rises, the film on the probe will absorb more ammonium ions to stay in equilibrium with the surrounding atmosphere. If the ammonia vapor concentration of the surrounding atmosphere falls, some of the ammonium ions in the film solution will escape into the atmosphere as free ammonia to again maintain equilibrium. Because of this feature, the present invention can be used to continually monitor the concentration of a particular vapor in the atmosphere. Tests have shown that a reduction in vapor concentration is just as rapidly detected and indicated as a corresponding rise in vapor concentration.

I claim:

1. A gas testing apparatus, comprising:
   a. a probe having a pair of spaced, generally parallel arm portions connected at one end of each by a curved connecting portion, said arm portions terminating at their other ends in a pair of spaced end portions with conductive surfaces, said arm portions and said curved connecting portion having nonconductive surfaces;
   b. means connected to said conductive end portions for mounting said probe in a gas to be tested with said pair of arm portions generally vertically disposed and with said connecting portion being positioned above said end portions so that the entire nonconductive surface of said probe is available to be covered by a thin liquid film capable of absorbing the gas to be tested; and
   c. means including said conductive end portions for measuring the conductivity of the liquid film.

2. The apparatus of claim 1 wherein said probe is formed from a single glass rod having a round cross section and wherein said end portions have metallized surfaces.

3. Gas detecting and measuring apparatus, comprising:
   a. a nonporous probe having a pair of spaced arm portions terminating in a pair of end portions and being connected at their opposite ends by a curved connecting portion;
   b. the surfaces of said end portions being conductive, the surfaces of said arm portions and said connecting portion being nonconductive;
   c. a pair of electrodes connected to said end portions for supporting said probe with said arm portions thereof generally vertically disposed and with said curved connecting portion positioned above said end portions, said nonconductive portions having their entire surfaces free to carry a thin liquid film; and
   d. means including said electrodes and said conductive end portions for measuring the conductivity of the liquid film on the probe.

4. A method of measuring the ammonia content of an electroplating bath, comprising:
   a. partially filling a substantially closed container with a sample of the bath solution to be tested and allowing the concentration of ammonia vapor above the surface of the solution to reach equilibrium therewith;
   b. applying a thin liquid film to the surface of a probe having a pair of spaced arm portions terminating in a pair of end portions and being connected at their opposite ends by a curved connecting portion, the surfaces of said end portions being conductive, the surfaces of said arm portions and said connecting portion being nonconductive;
   c. placing the probe in the container above the surface of the solution, with the arm portions thereof generally vertically disposed and with the curved connecting portion positioned above the end portions, so that the probe is surrounded by the ammonia vapor emanating from the solution, until the concentration of ammonia in the film reaches equilibrium with the ammonia vapor in the surrounding atmosphere; and
   d. measuring the conductivity of the film on the probe as an indication of the ammonia content of the bath.

5. A method of measuring the amount of a selected vapor in an atmosphere, comprising:
   a. applying a thin liquid film capable of absorbing the vapor to be measured to the surface of a probe having a pair of spaced arm portions connected at one end of each by a curved connecting portion, said arm portions terminating at their other ends in a pair of spaced end portions with conductive surfaces, said arm portions and said curved connecting portion having nonconductive surfaces;

b. placing the probe in the atmosphere to be tested, and supporting said probe therein solely by contact with said conductive end portions with said pair of arm portions generally vertically disposed and with said curved connecting portion being positioned above said end portions so that the liquid film covers the entire surface of the nonconductive portions of said probe and so that the probe is surrounded by the atmosphere to be tested, until the concentration of vapor in the film reaches equilibrium with the surrounding atmosphere; and c. measuring the conductivity of the film on the probe as an indication of the vapor content of the atmosphere.